Sept. 29, 1964 J. H. REED III, ET AL 3,150,583
METHOD AND APPARATUS FOR MAKING STENCIL SCREENS FOR PRINTING
Filed Dec. 8, 1959 2 Sheets-Sheet 1

INVENTORS.
James H. Reed, III
Anson G. Sherman
BY
Webb, Mackay & Burden
THEIR ATTORNEYS

METHOD AND APPARATUS FOR MAKING STENCIL SCREENS FOR PRINTING

Filed Dec. 8, 1959 2 Sheets-Sheet 2

INVENTORS.
James H. Reed, III
Anson G. Sherman
BY
Webb, Mackay & Burden
THEIR ATTORNEYS

United States Patent Office 3,150,583
Patented Sept. 29, 1964

3,150,583

METHOD AND APPARATUS FOR MAKING STENCIL SCREENS FOR PRINTING

James H. Reed III and Anson G. Sherman, Pittsburgh, Pa., assignors to Dry-Screen Process, Inc., Pittsburgh, Pa., a corporation of Pennsylvania Filed Dec. 8, 1959, Ser. No. 858,229
5 Claims. (Cl. 95—77)

This invention relates to screen printing and more particularly to making stencils on screens used in printing designs, printed matter, printed circuits, solder markings, control panels, or combinations thereof.

In screen printing, a squeegee or similar device moves across a screen in pressure engagement therewith and forces a printing composition through the screen onto stock to be printed. The screen may be wire mesh or a fabric made from various kinds of fibers and is stretched tightly upon a frame. On the screen is a stencil comprising a design, printed matter, printed circuits, solder markings, control panels, or a combination thereof. The stock to be printed is placed beneath the screen and the squeezee is moved across the screen. During movement across the screen, it is forced down by engagement of the squeegee therewith so that the printing composition is forced through the screen. In printing, the screen is in contact with or a short distance above, the stock to be printed which generally is paper, cardboard, plastic or metal sheets, or laminations of metal and plastic sheets.

In recent years, screen printing has used thermoplastic inks or resist material which is forced through a heated screen onto a substantially cooler surface of stock to which it is quickly releases its heat and solidifies thereon. The resist is forced through open areas of the stencil on the heated screen down onto the stock by the squeegee which travels over and in pressure engagement with the screen. As the resist is delivered through the screen, it makes contact with the surface of the stock in a progressive line of contact resulting from downward pressure of the squeegee upon the screen. Tautness in the screen causes the resist to be left deposited on the stock while the screen progressively frees itself from engagement with the resist as the squeegee travels thereover.

Two factors present in screen printing with thermoplastic ink produce distortion in the printed matter on the stock. These two factors are a mechanical distortion which results from pressure engagement of the squeegee upon the screen, thereby producing deflection and stretch in the screen and the stencil thereon and a thermal distortion which is caused by heating of the screen bringing about expansion of the screen and the stencil thereon. As a result of the expansion in the screen from heating and of the deflection of the screen from pressure engagement by the squeegee, the stencil on the screen is distorted during printing, thus effecting distortion in the printed matter. Accordingly, where dimensional accuracy is required, compensation must be made for the thermal distortion and the mechanical distortion. This is particularly true in manufacture of printed circuits for the electronic industry.

We have invented a method and apparatus which compensates for thermal and mechanical distortion of the screen during printing to produce printed matter which has a high degree of dimensional accuracy. Our invention produces stencils on the printing screens which stencils have been made under conditions which simulate the expansion in the screen caused by heating it and by deflection of the screen resulting from pressure engagement of the squeegee therewith during printing. By simulating the mechanical and thermal distortion during making of a stencil on a screen, we compensate for the mechanical and thermal distortion of the screen encountered during printing. Specifically, our invention comprises a method for making the stencil screens wherein a screen is heated to substantially that temperature used for printing. This screen is coated with a photographic emulsion which is adapted for forming a stencil thereon. The emulsion-coated screen is brought into engagement with one side of a stable film or plate made from material which transmits light rays substantially free from distortion for producing a stencil having sharp, clear lines on the emulsion-coated screen. Engagement of the screen with the film or plate results from deflecting the screen out of its plane to press it against the film or plate. Preferably, the plate is a glass one. On one side of the plate is design matter to be printed which design matter is the subject of the stencil on the emulsion-coated screen. Application of pressure to the screen deflects it out of its plane and brings it into engagement with the side of the film or plate having the design matter thereon. The pressure to deflect the screen and bring it into engagement with the plate simulates that exerted by the squeegee on the screen during printing. Simultaneously with application of pressure on the screen and matter to be printed, we apply heat to the screen during its pressure engagement with the matter to be printed and then immediately expose the screen to light rays which pass through the plate onto the screen for a predetermined time to effect a stencil of the matter to be printed on the screen. Immediately after exposure, we withdraw application of pressure to the screen and to the matter to be printed and terminate application of heat to the screen during exposure to the light rays.

The apparatus which we employ for making the stencil screens comprises a combination of means which mount the glass plate or film having the matter to be printed on one side thereof. The glass plate is positioned relative to the mounting means to permit passage of light through the glass plate and through the transparent portion of the side having the matter to be printed. A screen carried by the frame has a photographic emulsion coating which is adapted for forming a stencil of the matter to be printed. This screen is adapted for being heated and adapted to be connected to a source of energy for heating it. Means support the frame and the emulsion-coated screen relative to the side of the glass plate having matter to be printed so that the screen is opposite this side of the plate and so that it is spaced a short distance apart from the matter to be printed. Means such as a resilient pad is movably positioned for pressure engagement with the screen to bring it into pressure contact with the matter to be printed on the glass plate. The resilient pad is adapted to be heated and adapted to be connected to a source of energy for heating it. In addition, there are means for effecting a controlled pressure engagement of the pad with the screen to bring the screen into pressure contact with the glass plate.

In the accompanying drawings, we have shown one preferred embodiment of our invention in which.

Figures 1, 2, 3, 4, 5:
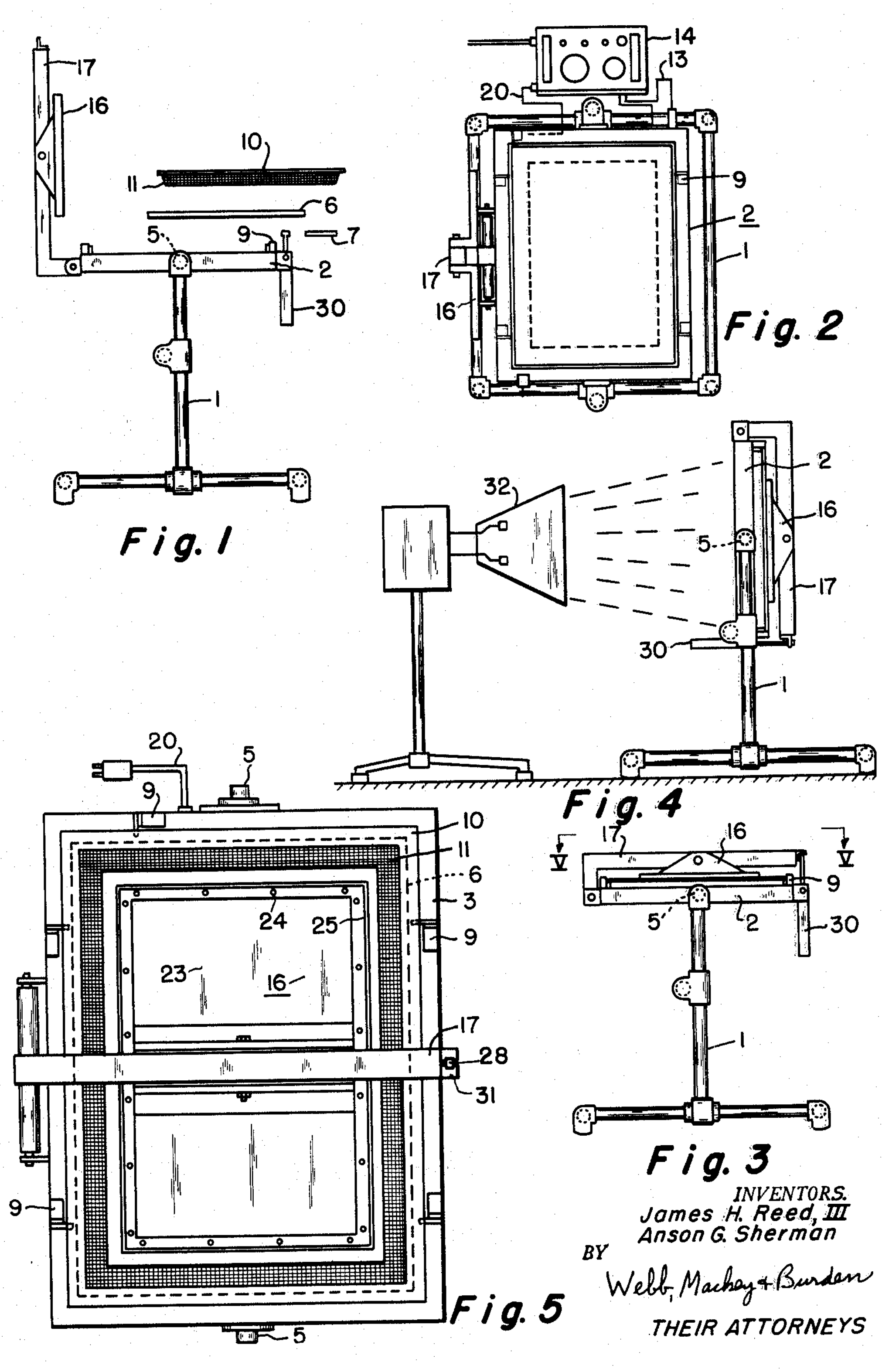
FIGURE 1 is a side elevation view of apparatus embodying our invention with the resilient pad raised out of engagement with the screen.
FIGURE 2 is a plan view of the apparatus of FIGURE 1.
FIGURE 3 is a side elevation view of the apparatus of FIGURE 1 with the resilient pad in engagement with the screen.
FIGURE 4 is a side elevation view of the apparatus of FIGURE 3 positioned to receive light rays from an arc lamp.
FIGURE 5 is an enlarged plan view along the line V—V of FIGURE 3.

As shown in FIGURES 1–6 inclusive, our apparatus is mounted upon a stand 1 which carries a table 2 made from a metal frame 3 and a glass bed 4 housed by the metal frame. Pivot pins 5 mount the table 2 upon the stand 1 and permit it to be turned clockwise through 90° from a horizontal position to a vertical position (FIGURES 3 and 4).

Disposed upon the glass bed is a glass photographic plate 6 held in a desired position and alignment on the bed by tape 7 which engages the bed and a part of the periphery of the glass plate. On the side 8 of the glass plate which is not in contact with the glass bed is the design of the matter to be printed such as an electronic circuit made of opaque lines. The side 8 of the glass plate may be a negative or positive of a photographic plate.

Figure 6:
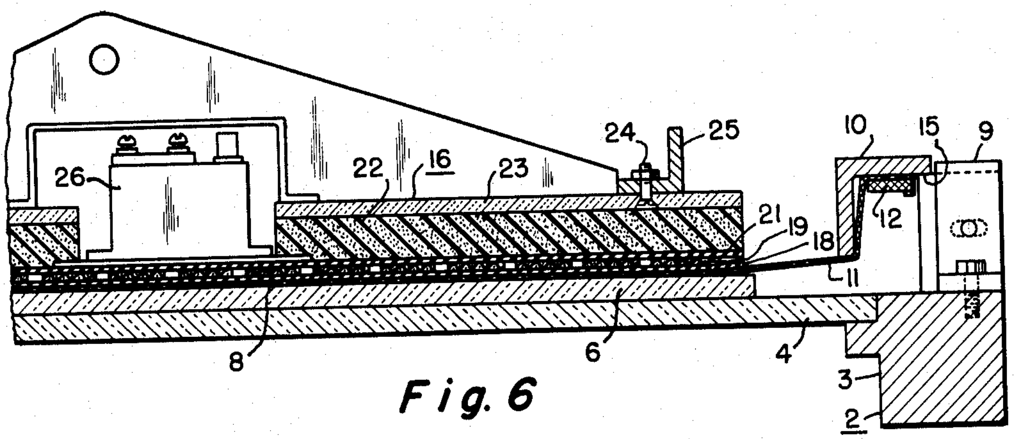
FIGURE 6 is an enlarged fragmentary cross section view of FIGURE 5.
Figure 7:
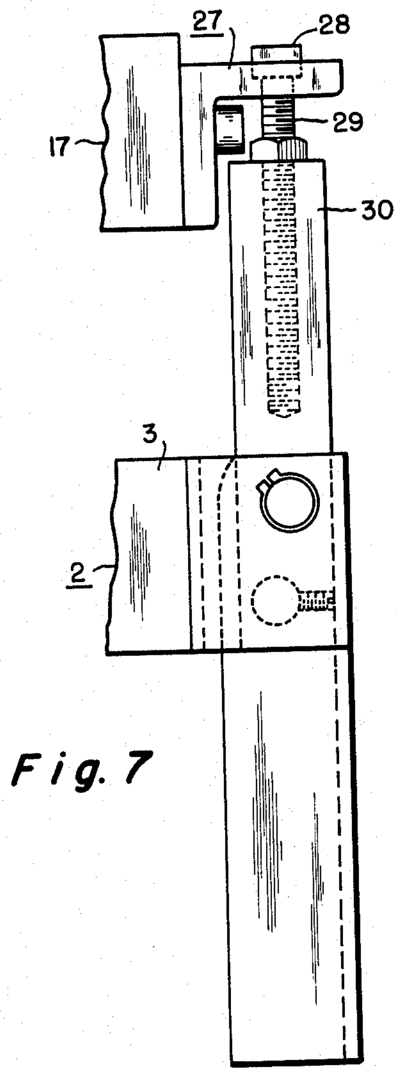
FIGURE 7 is a side elevation view of a latch assembly for the resilient pad of the apparatus of FIGURE 1.

Positioned about the metal frame 3 are deflection stops 9 which mount an angle bar screen frame 10 having a screen 11 stretched thereon. As shown in FIGURE 6, the screen is affixed tautly to the frame by knurled nuts 12.

The screen is stainless steel cloth which has a relatively high electrical resistance and thus serves as its own heating element. Electrical conduits 13 connect the screen to a source of power through a control box 14. The screen 11 has a photographic emulsion coating.

The deflection stops 9 have a shoulder 15 which engages the screen frame 10 and supports the screen 11 above the glass plate so that it is spaced a short distance apart therefrom and does not touch the glass plate. Of course, when a resilient pressure pad 16 engages the screen to bring it into engagement with the matter to be printed, the screen is not spaced apart from the glass plate 6.

Pivotally mounted on one side of the metal frame 3 is one end of a crossarm 17 which carries the resilient pressure pad 16. FIGURE 1 shows the crossarm in its vertical position with the pad out of engagement with the screen and FIGURE 3 shows the crossarm moved to its horizontal position to bring the resilient pad into engagement with the screen.

The resilient pad comprises successive layers of (1) a fine sheet of rubber 18 such as neoprene which engages the screen 11; (2) a heating element 19 comprising a series of electrical resistant elements connected to a source of electric power through a conduit 20 and the control box 14; (3) a second sheet of rubber 21 such as neoprene; (4) a layer of sponge rubber 22; and (5) a back-up plate 23 made from paper base, reinforced phenolic laminate or other suitable stiff or rigid material. Attached to the back-up plate through bolts 24 is a reinforcing angle bar frame 25. The layers of rubber sheet, heating element, sponge rubber and back-up plate are bonded together by a suitable cement or bonding agent such as Pliobond.

The pressure pad carries a thermostat control 26 thereon (FIGURE 6). The thermostat control and the control box 14 regulate heating of the resilient pressure pad to bring it and to maintain it at a desired temperature for making stencils on the screen.

Figure 8:
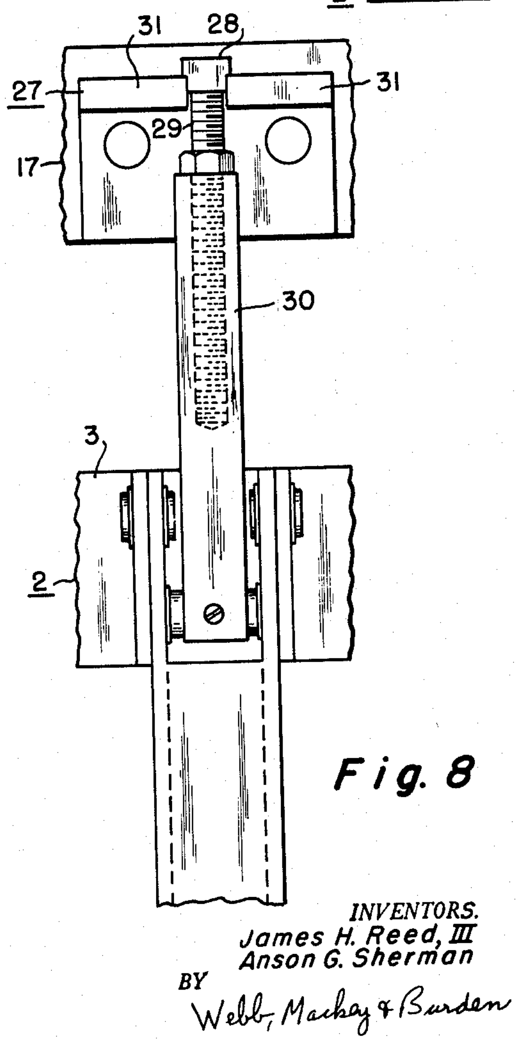
FIGURE 8 is a front elevation view of the latch assembly view of FIGURE 7.

The other end of the crossarm 17 has a forked or bifurcated member 27 which engages a head 28 on an adjustment bolt 29 carried by one end of a latch 30. The latch 30 is pivotally mounted upon the metal frame 3 and when the crossarm is lowered from its vertical position (FIGURE 1) to its horizontal position (FIGURE 3) to bring the resilient pad into engagement with the screen, the latch is pivoted to meet and engage the bifurcated member so that the head 28 contacts the two prongs 31 of the forked member 27 (FIGURE 8). By adjustment of the bolt 29, pressure is controllably exerted by the pad upon the screen and glass plate to simulate pressure exerted by the squeegee upon the screen during printing.

In making a stencil on the screen of the printed matter on the glass plate, the plate is positioned on the glass bed by tape or other suitable means and aligned thereon so that the stencil is properly positioned on the emulsion-coated screen which is aligned relative to the glass plate by the deflection stops.

We have found that presently available photographic film as distinguished from a glass plate or a plate made from material which transmits light rays substantially free from distortion for producing stencils with sharp clear lines cannot be used because heat from the screen buckles the film and the resulting stencil is useless. However, a film made from material which does not buckle when subjected to the heat from the screen and which transmits light rays substantially free from distortion can be used in place of a plate.

The screen frame and screen are placed upon the deflection stops and supported thereby so that the screen does not touch the glass plate. The screen is heated an amount determined by trial and error and preferably to the temperature at which printing is carried out. When exposing the screen which is coated with a photographic emulsion, we may heat the screen an additional amount for a short period just prior to the exposure to the light rays. In this connection, for example, where 95 amperes current are used for heating the screen during printing, we may employ 15 to 20 additional amperes in heating for about 15 to 25 seconds prior to bringing the resilient pad into engagement with the screen and the screen into pressure contact with the glass plate. This use of additional power for the short time is to partially allow for loss of heat from the screen to the glass plate when there is contact with one another.

The resilient pad is controllably heated through the thermostat 26 and control box 14 to a temperature determined by experience. One temperature which we have used is 160° F. and the pad was heated to this temperature prior to bringing it into contact with the screen for about 20 minutes.

Heating of the resilient pad compensates for loss of heat from the screen to the glass plate during engagement by the screen with the glass plate.

Timing is important in making the stencils on the screen because heat from the screen and/or from the resilient pad may crack or break the glass plate and where the plate is a negative or positive photographic one, the heat may damage the emulsion thereon.

After the resilient pad has been heated and with the screen heated, the pad is brought into engagement with the screen and forces the screen down into engagement with the glass plate. Pressure is applied to the screen and the plate through adjustment of the bolt 29 on the latch 30. The amount of pressure which we preferably employ simulates that exerted by the squeegee on the screen during printing. This pressure must not be so high as to cause breakage of the glass plate.

Immediately after pressure engagement of the pad with the glass plate, the table is rotated to its vertical position (FIGURE 4) to present the glass plate and screen to an arc lamp 32. Then the plate and screen are exposed to light rays from the arc lamp which travel through the glass plate onto the screen for a predetermined exposure time. One exposure time we have used is 65 seconds and one distance between the arc lamp and the glass plate which we have used is 36″.

Quickly after completion of exposure to light rays from the arc lamp, screen current is turned off, the table is swung to its horizontal position and the resilient pad is raised up off the screen.

Preferably, making of the stencils should be carried out under safe light.

The heating of the screen simulates thermal distortion experienced during screen printing, and application of pressure to the screen during making of the stencil simulates mechanical deflection and distortion of the screen produced by travel of the squeegee over and in engagement with the screen during printing.

Heating of the resilient pad insures that the screen will not lose its heat to the glass plate during making of the stencil and thus provides for thermal distortion of the screen throughout making of the stencil to effect compensation for the thermal distortion encountered during printing.

Our invention has significant advantages which render it highly desirable for making stencils for screen printing where extreme dimensional accuracy in the printed matter is required. Such accuracy is particularly important in manufacture of printed circuits for the electronic industry and for manufacture of other items used in industries where dimensional accuracy is a prime consideration. Ability to obtain the results from our invention is effected through compensating for thermal distortion and for mechanical distortion of the screen during printing. By heating the screen and by using a heated pad, we compensate for the thermal distortion and by exerting or applying pressure to the screen, we compensate for mechanical distortion. Accordingly, stencils produced in accordance with our invention have an important high degree of dimensional accuracy.

The term "plate" as used in the claims includes not only a plate but also a film made from material which does not buckle when subjected to the heat from the screen and which transmits light rays substantially free from distortion.

While we have shown and described a preferred embodiment of our invention, it will be understood that it may be otherwise embodied within the scope of the appended claims.

We claim:

1. In apparatus for making screen stencils for printing, the combination comprising a support for a plate made from material which transmits light rays substantially free from distortion, said plate having design matter to be printed on one side thereof, said support holding said plate in position to permit passage of light through the one side bearing the design matter to be printed, a frame, a screen carried by the frame, said screen having an emulsion coating for forming upon exposure to light, a stencil on the screen, means for heating said screen and causing it to expand, means to support said frame so as to position the emulsion coated screen generally parallel to but spaced from the light transmitting plate, and means to apply pressure against a portion of the screen to move that portion from its position on the frame and press it into a position parallel to and in contact with the plate.

2. Apparatus for making screen stencils for printing as described in claim 1, and in which said means for applying pressure against the screen embodies means for heating the screen.

3. Apparatus for making stencil screens for printing as described in claim 1 in which the means for applying pressure against the screen comprises a flat resilient pad having an area sufficient in size to extend beyond the design matter to be printed on the screen.

4. Apparatus for making stencil screens for printing as described in claim 3 in which the resilient pad has a heating element for applying heat to the screen when the pad is pressed against the screen.

5. Apparatus for making stencil screens for printing as described in claim 3 and having means for adjustably controlling the pressure exerted by the resilient pad against the screen.

References Cited in the file of this patent

UNITED STATES PATENTS

| | | |
|---|---|---|
| 978,261 | Albert | Dec. 13, 1910 |
| 1,343,613 | Boysen | June 15, 1920 |
| 1,675,561 | Keel | July 3, 1928 |
| 1,691,281 | Graves | Nov. 13, 1928 |
| 1,780,677 | Huebner | Nov. 4, 1930 |
| 1,923,108 | Mehl et al. | Aug. 22, 1933 |
| 2,064,764 | Playford et al. | Dec. 15, 1936 |
| 2,608,750 | Cluzel | Sept. 2, 1952 |
| 2,637,255 | Pleydell et al. | May 5, 1953 |
| 2,651,244 | Ferguson | Sept. 8, 1953 |
| 2,740,895 | Miller | Apr. 3, 1956 |
| 2,958,778 | Miller | Nov. 1, 1960 |

OTHER REFERENCES

Swiggett: "Introduction to Printed Circuits," 1956, page 4.

Eisler: "The Technology of Printed Circuits," 1959, pages 72–89.